United States Patent
Kang et al.

(10) Patent No.: US 11,268,027 B2
(45) Date of Patent: *Mar. 8, 2022

(54) LIQUID CRYSTAL COMPOSITION, LIQUID CRYSTAL DISPLAY ELEMENT AND LIQUID CRYSTAL DISPLAY

(71) Applicant: Shijiazhuang Chengzhi Yonghua Display Material Co., ltd., Hebei (CN)

(72) Inventors: Sumin Kang, Hebei (CN); Zhian Liang, Hebei (CN); Guoliang Yun, Hebei (CN); Ruixiang Liang, Hebei (CN); Jiaming Li, Hebei (CN); Xuan Zhang, Hebei (CN)

(73) Assignee: SHIJIAZHUANG CHENGZHI YONGHUA DISPLAY MATERIAL CO., LTD., Shijiazhuang (CN)

( * ) Notice: Subject to any disclaimer, the term of this patent is extended or adjusted under 35 U.S.C. 154(b) by 173 days.

This patent is subject to a terminal disclaimer.

(21) Appl. No.: 16/381,450

(22) Filed: Apr. 11, 2019

(65) Prior Publication Data

US 2020/0239776 A1    Jul. 30, 2020

(30) Foreign Application Priority Data

Jan. 29, 2019    (CN) .......................... 201910087675.7

(51) Int. Cl.
*C09K 19/34* (2006.01)

(52) U.S. Cl.
CPC ...... *C09K 19/3491* (2013.01); *C09K 19/3405* (2013.01); *C09K 2019/3408* (2013.01)

(58) Field of Classification Search
CPC .................................................. C09K 19/30
See application file for complete search history.

(56) References Cited

U.S. PATENT DOCUMENTS

| 9,745,513 | B2* | 8/2017 | Kuriyama | ............ | C09K 19/542 |
| 2015/0152330 | A1* | 6/2015 | Yun | ................ | C09K 19/30 |
| | | | | | 252/299.63 |
| 2015/0175884 | A1* | 6/2015 | Hirschmann | ...... | C09K 19/0403 |
| | | | | | 252/299.63 |
| 2015/0299161 | A1* | 10/2015 | Reiffenrath | .......... | C07D 409/04 |
| | | | | | 252/299.61 |
| 2017/0362506 | A1* | 12/2017 | Hirschmann | .......... | C09K 19/12 |

* cited by examiner

*Primary Examiner* — Chanceity N Robinson
(74) *Attorney, Agent, or Firm* — Muncy, Geissler, Olds & Lowe, P.C.

(57) ABSTRACT

A liquid crystal composition, and a liquid crystal display element or liquid crystal display comprising the liquid crystal composition, and belongs to the field of liquid crystal display, wherein the liquid crystal composition comprises a compound represented by formula I, one or more compounds represented by formula II, one or more compounds represented by formula III, one or more compounds represented by formula IV, and at least one polymerizable compound, and has a large dielectric anisotropy (Δε) and a large optical anisotropy (Δn), and has an obvious advantage in the development of a liquid crystal display having a high transmittance and a low cell thickness.

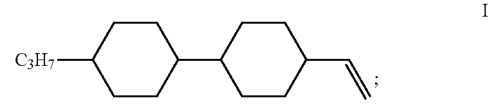

I

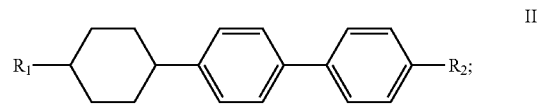

II

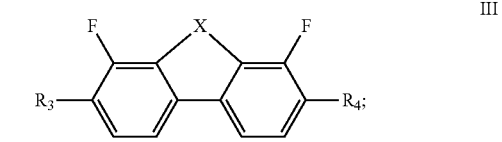

III

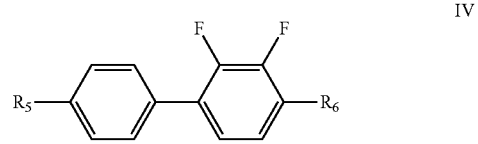

IV

6 Claims, No Drawings

LIQUID CRYSTAL COMPOSITION, LIQUID CRYSTAL DISPLAY ELEMENT AND LIQUID CRYSTAL DISPLAY

TECHNICAL FIELD

The present disclosure belongs to the field of liquid crystal display, and more particularly relates to a liquid crystal composition and a liquid crystal display element or liquid crystal display comprising the liquid crystal composition.

BACKGROUND ART

Early commercial TFT-LCD products basically relate to using a TN display mode, and the largest problem thereof is a narrow viewing angle. With the increase in product size, especially in applications in the TV field, an IPS display mode and a VA display mode, which feature a wide view angle, have been sequentially developed and applied; in particular, on the basis of the improvement of the VA display mode, many big companies have successively made a breakthrough in the development thereof, which mainly depends on the advantages of a wide view angle, a high contrast, no need for rubbing alignment, etc., of the VA mode itself; furthermore, the contrast of the VA mode display is less dependent on the optical anisotropy (Δn) of a liquid crystal, the thickness of a liquid crystal cell (d) and the wavelength (λ) of an incident light, which will inevitably make the VA mode become a very promising display technique.

However, liquid crystal media for the VA mode, etc., themselves are not perfect, and compared with positive dielectric anisotropic display elements, they have the disadvantages of a smaller dielectricity, a relatively slow response time, a relatively high drive voltage, etc., and are more prone to the problems of defective displaying, afterimage etc.

At present, liquid crystal compositions which are applicable to display devices and have a large dielectric anisotropy and a large optical anisotropy are still desired.

SUMMARY OF THE INVENTION

In order to solve the problems in the prior art, the present inventors have conducted intensive studies and surprisingly found that a liquid crystal composition containing a combination of a compound represented by formula I, a compound represented by formula II, and a compound represented by formula III, and a compound represented by formula IV as mentioned hereinafter exhibits a fast response speed when applied to a liquid crystal display element, thereby completing the present disclosure.

A first object of the present disclosure is to provide a liquid crystal composition having a larger dielectric anisotropy (Δε) and a larger optical anisotropy.

A second object of the present disclosure is to provide a liquid crystal display element comprising the liquid crystal composition of the present disclosure, which liquid crystal display element has the advantages of a high transmittance and a low cell thickness.

A third object of the present disclosure is to provide a liquid crystal display comprising the liquid crystal composition of the present disclosure, which liquid crystal display has the advantages of a high transmittance and a low cell thickness.

In order to achieve the above-mentioned objects, the following technical solution is used in the present disclosure:

The liquid crystal composition of the disclosure comprises a compound represented by formula I, one or more compounds represented by formula II, one or more compounds represented by formula III, one or more compounds represented by formula IV, and at least one polymerizable compound:

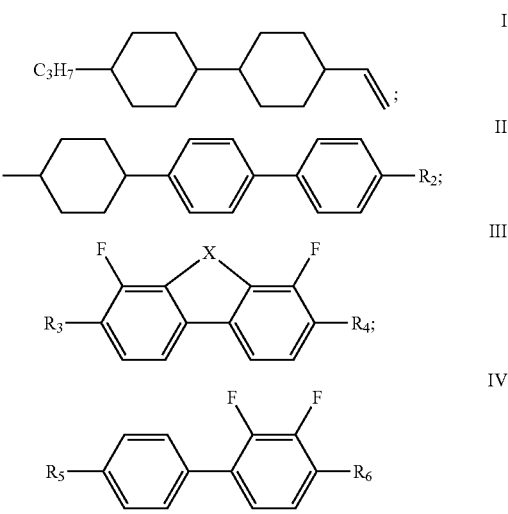

wherein
$R_1$ and $R_2$ each independently represent an alkyl group having a carbon atom number of 1-10;
$R_3$ and $R_4$ each independently represent an alkyl group having a carbon atom number of 1-10, a fluorine-substituted alkyl group having a carbon atom number of 1-10, an alkoxy group having a carbon atom number of 1-10 or a fluorine-substituted alkoxy group having a carbon atom number of 1-10, and any one or more unconnected $CH_2$ in the groups represented by $R_3$ and $R_4$ are optionally substituted with cyclopentyl, cyclobutyl or cyclopropyl; X represents O or S; and
in formula IV, $R_5$ and $R_6$ each independently represent an alkoxy group having a carbon atom number of 1-10.

The present disclosure further provides a liquid crystal display element comprising the liquid crystal composition of the present disclosure, which liquid crystal display element is an active matrix addressing display element or a passive matrix addressing display element.

The present disclosure further provides a liquid crystal display comprising the liquid crystal composition of the present disclosure, which liquid crystal display is an active matrix addressing display or a passive matrix addressing display.

DETAILED DESCRIPTION OF EMBODIMENTS

The liquid crystal composition of the disclosure comprises a compound represented by formula I, one or more compounds represented by formula II, one or more compounds represented by formula III, one or more compounds represented by formula IV, and at least one polymerizable compound:

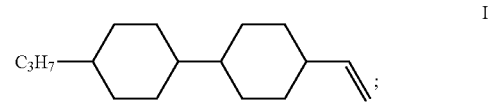

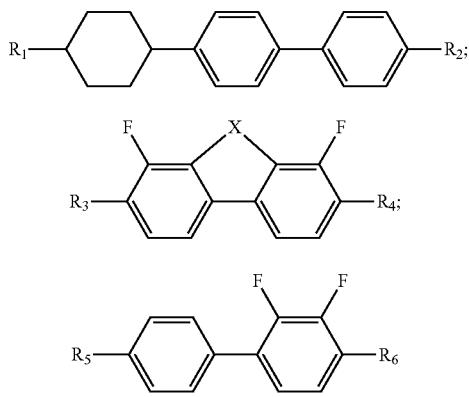

wherein in formula II, $R_1$ and $R_2$ each independently represent an alkyl group having a carbon atom number of 1-10;

in formula III, $R_3$ and $R_4$ each independently represent an alkyl group having a carbon atom number of 1-10, a fluorine-substituted alkyl group having a carbon atom number of 1-10, an alkoxy group having a carbon atom number of 1-10 or a fluorine-substituted alkoxy group having a carbon atom number of 1-10, and any one or more unconnected $CH_2$ in the groups represented by $R_3$ and $R_4$ are optionally substituted with cyclopentyl, cyclobutyl or cyclopropyl; X represents O or S; and in formula IV, $R_5$ and $R_6$ each independently represent an alkoxy group having a carbon atom number of 1-10.

As the alkyl groups having a carbon atom number of 1-10 as represented by $R_1$ and $R_2$ in formula II mentioned above, examples include methyl, ethyl, n-propyl, isopropyl, n-butyl, isobutyl, tert-butyl, n-pentyl, isopentyl, n-hexyl, isohexyl, n-heptyl, octyl, nonyl, decyl, etc.

As the alkyl groups having a carbon atom number of 1-10 as represented by $R_3$ and $R_4$ in formula III mentioned above, examples include methyl, ethyl, n-propyl, isopropyl, n-butyl, isobutyl, tert-butyl, n-pentyl, isopentyl, n-hexyl, isohexyl, n-heptyl, octyl, nonyl, decyl, etc. As the alkoxy groups having a carbon atom number of 1-10 as represented by $R_3$ and $R_4$ in formula III mentioned above, examples include methoxy, ethoxy, n-propoxy, isopropoxy, n-butoxy, isobutoxy, pentyloxy, hexyloxy, heptyloxy, octyloxy, nonyloxy, decyloxy etc. Any one or more unconnected $CH_2$ in the groups represented by $R_3$ and $R_4$ are optionally substituted with cyclopentyl, cyclobutyl or cyclopropyl.

In formula IV mentioned above, as the alkoxy groups having a carbon atom number of 1-10 as represented by $R_5$ and $R_6$ mentioned above, examples include methoxy, ethoxy, n-propoxy, isopropoxy, n-butoxy, isobutoxy, pentyloxy, hexyloxy, heptyloxy, octyloxy, nonyloxy, decyloxy etc.

The fluorine substitution as mentioned above may be a monofluoro substitution, a difluoro substitution or a trifluoro substitution, etc., and the fluorine substitution may be a fluorine substitution on a single carbon atom or may also be a fluorine substitution on different carbon atoms.

In the liquid crystal composition of the present disclosure, the above-mentioned polymerizable compound is preferably selected from formulas RM-1 to RM-8

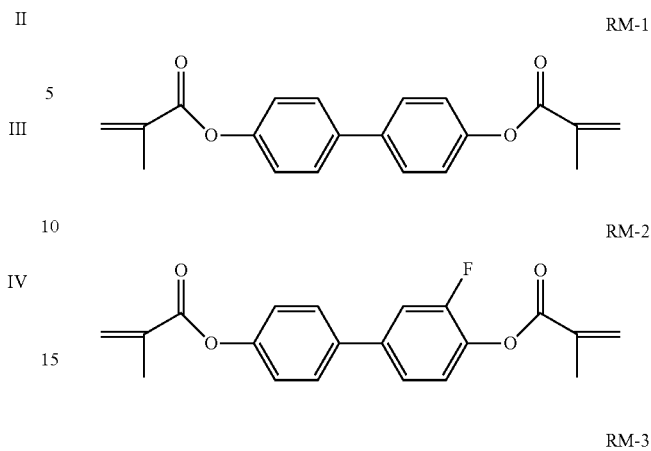

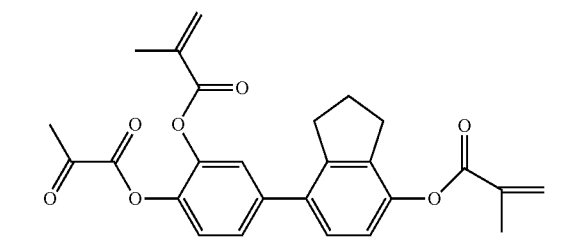

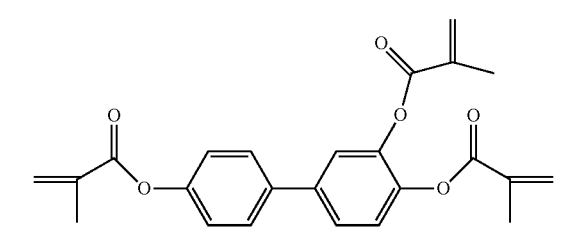

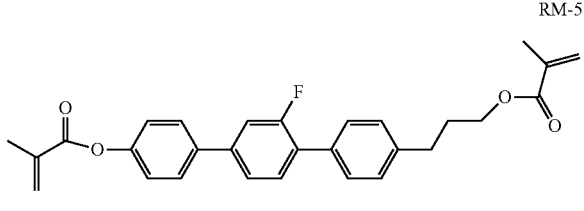

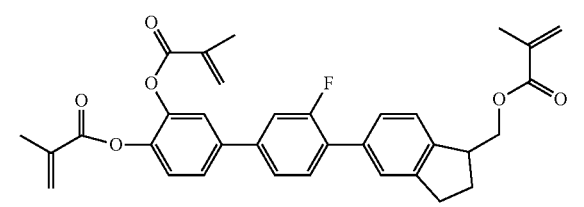

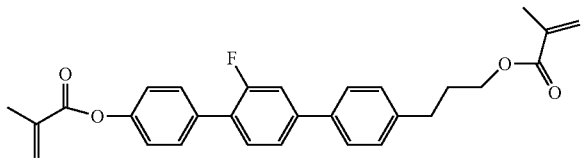

RM-8

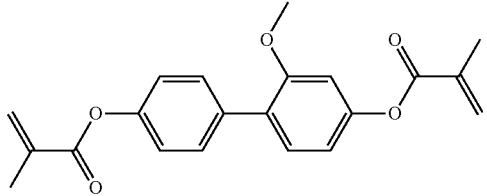

In the liquid crystal composition of the present disclosure, preferably, the compound represented by formula III mentioned above is selected from the group consisting of compounds represented by formula III-1 to III-12 below:

III-1

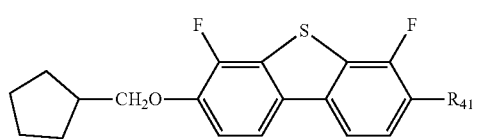

III-2

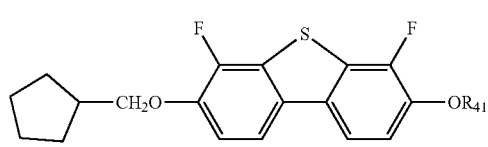

III-3

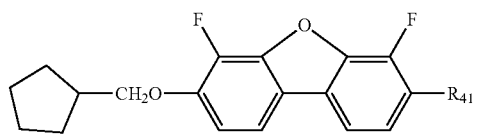

III-4

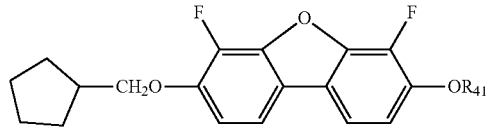

III-5

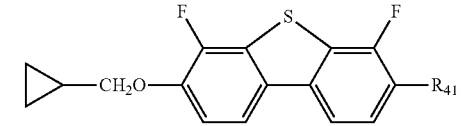

III-6

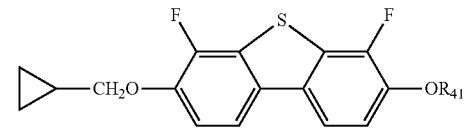

III-7

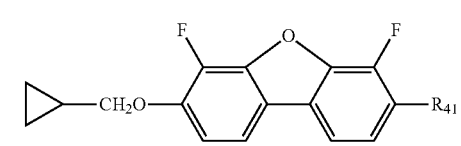

III-8

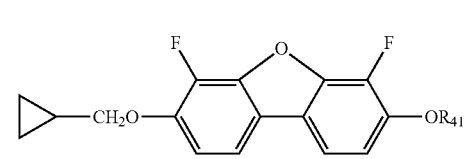

III-9

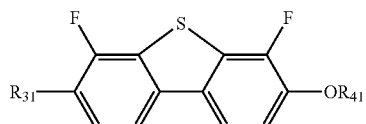

III-10

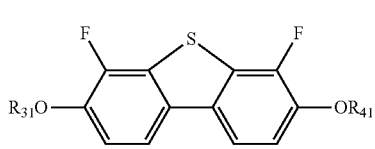

III-11

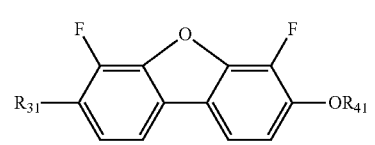

III-12

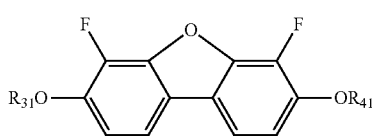

wherein
$R_{31}$ and $R_{41}$ each independently represent an alkyl group having a carbon atom number of 1-10.

The liquid crystal composition of the present disclosure preferably further comprises one or more compounds represented by formula V:

V

wherein
$R_7$ and $R_8$ represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8, and any one or more unconnected $CH_2$ in the groups represented by $R_7$ and $R_8$ are optionally substituted with cyclopentyl, cyclobutyl or cyclopropyl;

$Z_1$ and $Z_2$ each independently represent a single bond, —$CH_2CH_2$— or —$CH_2O$—;

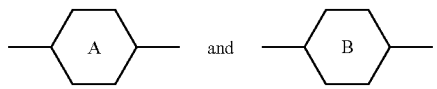

represent 1,4-cyclohexylene, 1,4-cyclohexenylene, 1,4-phenylene or a fluorinated 1,4-phenylene; and
m and n each independently represent 0, 1 or 2, with m+n≤2;

furthermore, where m+n=1, $Z_1$ and $Z_2$ are single bonds, and

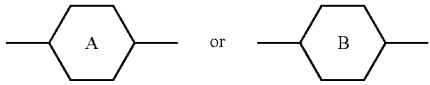

represent 1,4-phenylene, $R_3$ and $R_4$ do not simultaneously represent an alkoxy group having a carbon atom number of 1-10.

In the liquid crystal composition of the present disclosure, preferably, the compound represented by formula V mentioned above is selected from the group consisting of compounds represented by formula V-1 to V-14:

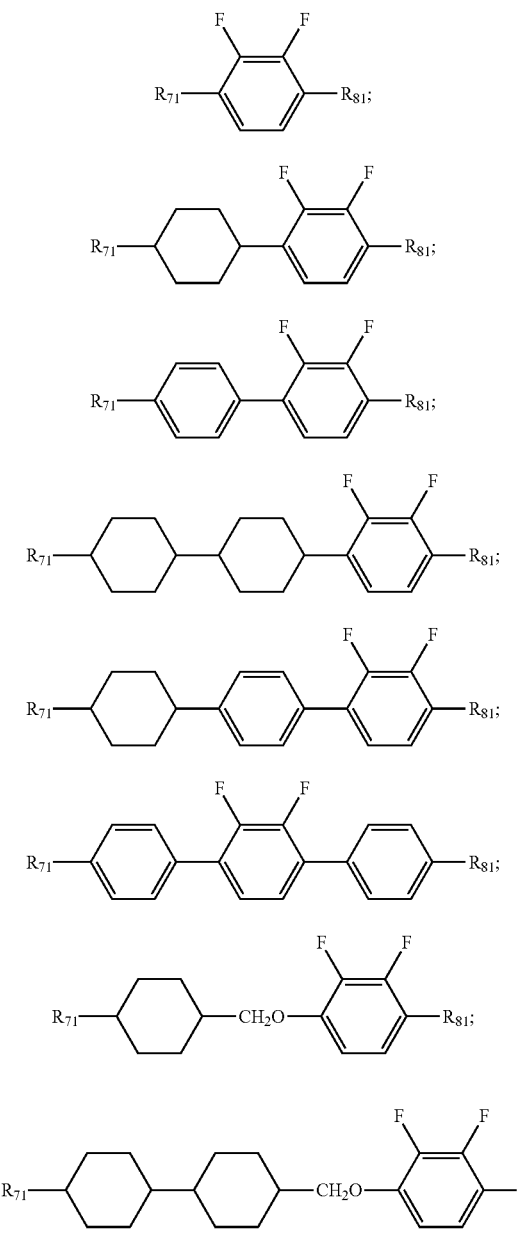

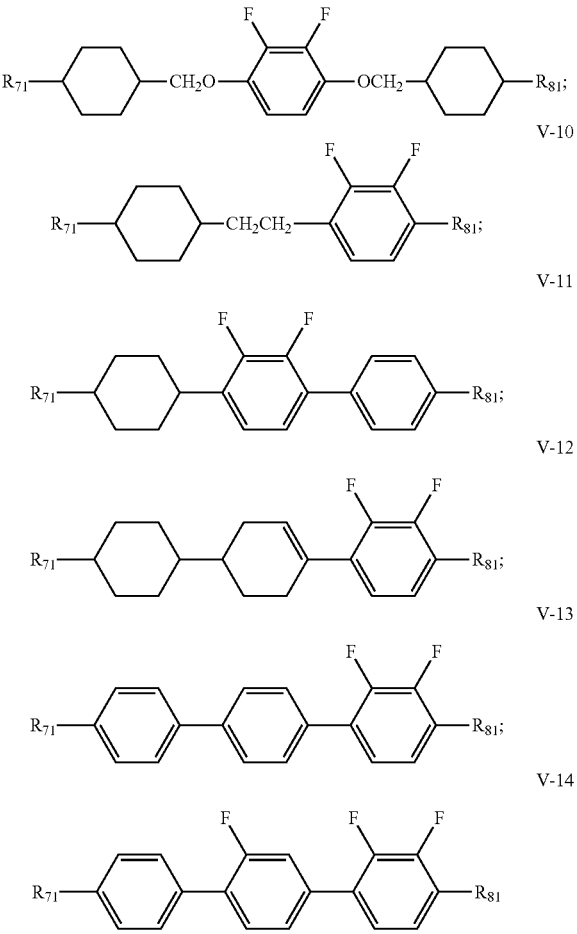

wherein $R_{71}$ represents an alkyl group having a carbon atom number of 1-10, a fluorine-substituted alkyl group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8; $R_{81}$ represents an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10 or an alkenoxy group having a carbon atom number of 3-8; and any one or more unconnected $CH_2$ in the groups represented by $R_{71}$ and $R_{81}$ are optionally substituted with cyclopentyl, cyclobutyl or cyclopropyl.

In the liquid crystal composition of the present disclosure, preferably, where the total of the components other than the polymerizable compound is 100% by mass, the total mass content of the compound represented by formula I above is 1%-55%; the total mass content of the compound represented by formula II above is 1%-17%; the total mass content of the compound represented by formula III above is 1%-30%; the total mass content of the compound represented by formula IV above is 1-22%: and the polymerizable compound above is added in an amount of 0.01%-1%, preferably 0.03%-0.4% on the basis of the total mass % of the liquid crystal.

The liquid crystal composition of the present disclosure preferably further comprises one or more compounds represented by formula VI:

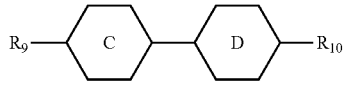

VI wherein $R_9$ and $R_{10}$ represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10; and

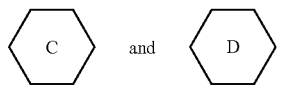

each independently represent 1,4-cyclohexylene, 1,4-cyclohexenylene or 1,4-phenylene; furthermore, where

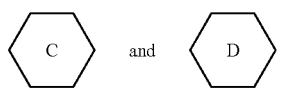

simultaneously represent 1,4-cyclohexylene, and one of $R_9$ and $R_{10}$ represents propyl, the other does not represent vinyl.

In the liquid crystal composition of the present disclosure, preferably, the compound represented by formula VI mentioned above is selected from the group consisting of compounds represented by formula VI-1 to VI-3 below:

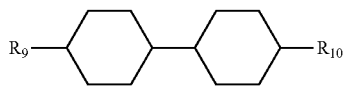

VI-1

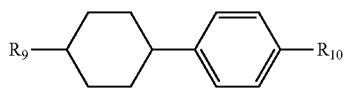

VI-2

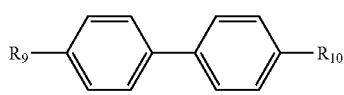

VI-3 wherein $R_9$ and $R_{10}$ represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10; and in formula VI-1, where one of $R_9$ and $R_{10}$ represents propyl, the other does not represent vinyl.

The liquid crystal composition of the present disclosure preferably further comprises one or more compounds represented by formula VII:

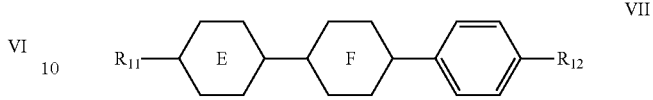

VII wherein $R_{11}$ and $R_{12}$ represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10; and

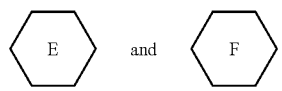

each independently represent 1,4-cyclohexylene, 1,4-cyclohexenylene or 1,4-phenylene;

furthermore, where

represents 1,4-cyclohexylene, and

represents 1,4-phenylene, $R_{11}$ and $R_{12}$ do not simultaneously represent an alkyl group having a carbon atom number of 1-10.

In the liquid crystal composition of the present disclosure, preferably, the compound represented by formula VII mentioned above is selected from the group consisting of compounds represented by formula VII-1 to VII-3 below:

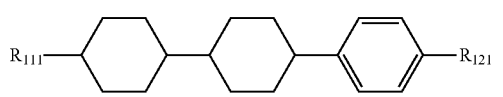

VII-1

VII-2

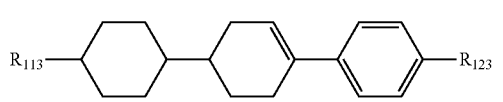

VII-3 wherein $R_{111}$, $R_{112}$, $R_{113}$, $R_{121}$, $R_{122}$ and $R_{123}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10; furthermore in formula VII-2, $R_{112}$ and $R_{122}$ do not simultaneously represent an alkyl group having a carbon atom number of 1-10.

[Liquid Crystal Display Element]

The liquid crystal display element of the present disclosure comprises the liquid crystal composition of the present disclosure, which liquid crystal display element is an active matrix display element or a passive matrix display element.

Optionally, said liquid crystal display element may be an active matrix liquid crystal display element.

Optionally, said active matrix display element may be, for example, a PSVA-TFT liquid crystal display element.

The liquid crystal display element comprising the liquid crystal composition of the present disclosure has a faster response speed and a smaller cell thickness.

[Liquid Crystal Display]

The liquid crystal display of the present disclosure comprises the liquid crystal composition of the present disclosure, which liquid crystal display is an active matrix display or a passive matrix display.

Optionally, said liquid crystal display may be an active matrix liquid crystal display.

Optionally, said active matrix display may be, for example, a PSVA-TFT liquid crystal display.

The liquid crystal display comprising the liquid crystal composition of the present disclosure has a faster response speed and a smaller cell thickness.

Example

In order to more clearly illustrate the present disclosure, the present disclosure is further described below in conjunction with preferred examples. A person skilled in the art should understand that the content described in detail below is illustrative rather than limiting, and should not limit the scope of protection of the present disclosure.

In this description, unless otherwise specified, percentages are mass percentages, temperatures are in degree Celsius (° C.), and the specific meanings of the other symbols and the test conditions are as follows:

Cp represents the clearing point (° C.) of the liquid crystal measured by a DSC quantitative method;

Δn represents an optical anisotropy, $n_o$ is the refractive index of an ordinary light, $n_e$ is the refractive index of an extraordinary light, with the test conditions being: 25±2° C., 589 nm and using an abbe refractometer for testing;

Δε represents dielectric anisotropy, $\Delta\varepsilon = \varepsilon_{//} - \varepsilon_\perp$, wherein $\varepsilon_{//}$ is a dielectric constant parallel to a molecular axis, and $\varepsilon_\perp$ is a dielectric constant perpendicular to the molecular axis, with the test conditions being 25±0.5° C., a 20 μm parallel cell, and INSTEC:ALCT-IR1 for testing;

γ1 represents a rotary viscosity (mPa·s), with the test conditions being: 25±0.5° C., using 20 micron parallel cells, and using INSTEC:ALCT-IR1 for testing; and K11 is twist elastic constant, and K33 is splay elastic constant, with the test conditions being: 25° C., INSTEC:ALCT-IR1, and 18 μm vertical cell;

A method for preparing the liquid crystal composition involves: weighing various liquid crystal monomers at a certain ratio and then placing them in a stainless steel beaker; placing the stainless steel beaker containing these liquid crystal monomers on a magnetic stirring instrument for heating and melting; and after the liquid crystal monomers in the stainless steel beaker are mostly melted, adding a magnetic rotor to the stainless steel beaker; uniformly stirring the mixture; and cooling the mixture to room temperature to obtain the liquid crystal composition.

In the examples of the present disclosure, liquid crystal monomer structures are represented by codes, wherein the codes of cyclic structures, end groups and linking groups of liquid crystals are represented as follows in tables 1 and 2.

TABLE 1

Corresponding code for ring structure

| Ring structure | Corresponding code |
|---|---|
|  | C |
| 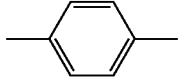 | P |
|  | L |
| 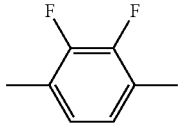 | Y |
| 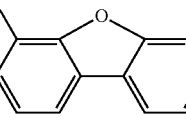 | Sb |
| 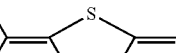 | Sc |
| 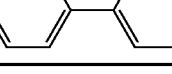 | Cp- |

TABLE 2

Corresponding code for end group and linking group

| End group and linking group | Corresponding code |
|---|---|
| $C_nH_{2n+1}$— | n- |
| $C_nH_{2n+1}O$— | nO— |
| —$CF_3$ | -T |
| —$OCF_3$ | -OT |
| —$CH_2O$— | —O— |
| —F | —F |
| —$CH_2CH_2$— | -E- |
| —CH=CH— | —V— |
| —CH=CH—$C_nH_{2n+1}$ | Vn— |

TABLE 2-continued

Corresponding code for end group and linking group

| End group and linking group | Corresponding code |
|---|---|
| 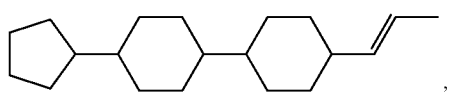 [SMILES: C/C=C/C1CCC(C2CCC(C3CCCC3)CC2)CC1 ; ","] | Cpr- |
| | Cpr1- |

EXAMPLES

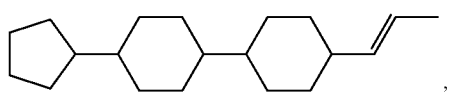 [SMILES: C/C=C/C1CCC(C2CCC(C3CCCC3)CC2)CC1 ; ","]

the code of which is CC-Cp-V1;

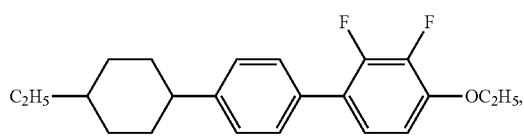 [SMILES: CCOc1ccc(-c2ccc(C3CCC(CC)CC3)cc2)c(F)c1F]

the code of which is CPY-2-O2;

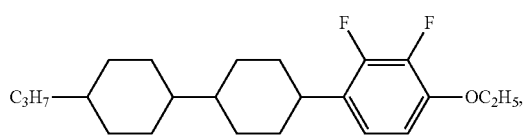

the code of which is CCY-3-O2;

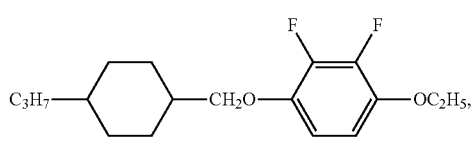

the code of which is COY-3-O2;

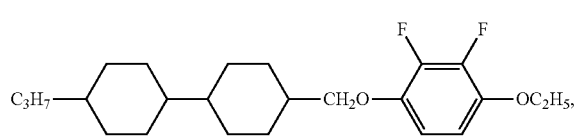

the code of which is CCOY-3-O2; and

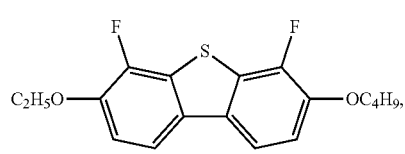

the code of which is Sc-2O-O4.

Example 1

The formulation of the liquid crystal composition and the corresponding properties thereof are as shown in table 3 below.

TABLE 3

Formulation of the liquid crystal composition of Example 1 and the corresponding properties thereof

| Category | Liquid crystal monomer code | Content (in parts by mass) |
|---|---|---|
| I | CC-3-V | 45 |
| II | CPP-3-2 | 5 |
| II | CPP-5-2 | 9 |
| III | Sc-2O-O4 | 5 |
| III | Sb-4O-O4 | 11 |
| III | Sb-Cp1O-O4 | 3 |
| IV | PY-2O-O2 | 7 |
| IV | PY-2O-O4 | 15 |
| | RM-4 | 0.25 |

Δε [1 KHz, 25° C.]: −3.5
Δn [589 nm, 25° C.]: 0.111
Cp: 57° C.
γ$_1$: 67 mPa · s
K33: 10.2

Comparative Example 1

The formulation of the liquid crystal composition and the corresponding properties thereof are as shown in table 4 below.

TABLE 4

Formulation of the liquid crystal composition of Comparative Example 1 and the corresponding properties thereof

| Category | Liquid crystal monomer code | Content (in parts by mass) |
|---|---|---|
| I | CC-3-V | 45 |
| II | CPP-3-2 | 5 |
| II | CPP-5-2 | 9 |
| III | Sc-2O-O4 | 5 |
| III | Sb-4O-O4 | 11 |
| III | Sb-Cp1O-O4 | 3 |
| | PY-2-O2 | 7 |
| | PY-3-O2 | 15 |
| | RM-4 | 0.25 |

Δε [1 KHz, 25° C.]: −3.2
Δn [589 nm, 25° C.]: 0.107
Cp: 49° C.
γ$_1$: 53 mPa · s
K33: 8.2

PY-2O-O2 and PY-2O-O4 in Example 1 are replaced by PY-2-O2 and PY-3-O2 to form Comparative Example 1. Compared with Comparative Example 1, the example of the present disclosure has a higher clearing point, an increased dielectric anisotropy, and an increased refractive index. Having a larger dielectric anisotropy gives an obvious advantage in developing a display with a low drive voltage, and having a better optical anisotropy gives an advantage in developing a low-thickness, fast-response product.

Example 2

The formulation of the liquid crystal composition and the corresponding properties thereof are as shown in table 5 below.

TABLE 5

Formulation of the liquid crystal composition of Example 2 and the corresponding properties thereof

| Category | Liquid crystal monomer code | Content (in parts by mass) |
|---|---|---|
| I | CC-3-V | 55 |
| II | CPP-3-2 | 3 |
| II | CPP-5-2 | 5 |
| II | CPP-3-1 | 2 |
| III | Sc-Cp1O-O4 | 7 |
| IV | PY-2O-O4 | 9 |
| IV | PY-2O-O4 | 5 |
| V | CY-3-O2 | 3 |
| V | CCY-3-O2 | 5 |
| V | CLY-3-O2 | 6 |
|  | RM-1 | 0.05 |

Δε [1 KHz, 25° C.]: −2.5
Δn [589 nm, 25° C.]: 0.093
Cp: 68° C.
$\gamma_1$: 57 mPa · s
K33: 13.7

Example 3

The formula of the liquid crystal composition and the corresponding properties thereof are as shown in table 6 below.

TABLE 6

Formulation of the liquid crystal composition of Example 3 and the corresponding properties thereof

| Category | Liquid crystal monomer code | Content (in parts by mass) |
|---|---|---|
| I | CC-3-V | 29.5 |
| II | CPP-3-2 | 5 |
| II | CPP-5-2 | 6 |
| III | Sc-4O-O4 | 2 |
| III | Sb-2O-O5 | 3 |
| IV | PY-2O-O2 | 5 |
| V | CY-3-O2 | 17 |
| V | CCOY-3-O2 | 15 |
| VI | CC-2-3 | 15 |
| VI | CP-3-O2 | 2.5 |
|  | RM-3 | 0.85 |

Δε [1 KHz, 25° C.]: −3.4
Δn [589 nm, 25° C.]: 0.087
Cp: 63° C.
$\gamma_1$: 66 mPa · s
K33: 12.2

Example 4

The formula of the liquid crystal composition and the corresponding properties thereof are as shown in table 7 below.

TABLE 7

Formulation of the liquid crystal composition of Example 4 and the corresponding properties thereof

| Category | Liquid crystal monomer code | Content (in parts by mass) |
|---|---|---|
| I | CC-3-V | 9.5 |
| II | CPP-3-2 | 5 |
| II | CPP-5-2 | 7 |
| III | Sc-CpO-O4 | 5 |
| IV | PY-2O-O2 | 7 |
| V | LY-Cp-O2 | 1 |
| V | PY-3-O2 | 13.5 |
| V | COY-3-O2 | 15 |
| VI | CC-5-3 | 8 |
| VI | CC-4-3 | 8 |
| VII | CCP-3-O1 | 5 |
| VII | CCP-V-1 | 3 |
| VII | CCP-V2-1 | 13 |
|  | RM-3 | 0.07 |

Δε [1 KHz, 25° C.]: −2.8
Δn [589 nm, 25° C.]: 0.105
Cp: 78° C.
$\gamma_1$: 72 mPa · s
K33: 13.2

Example 5

The formula of the liquid crystal composition and the corresponding properties thereof are as shown in table 8 below.

TABLE 8

Formulation of the liquid crystal composition of Example 5 and the corresponding properties thereof

| Category | Liquid crystal monomer code | Content (in parts by mass) |
|---|---|---|
| I | CC-3-V | 10 |
| II | CPP-3-2 | 5 |
| III | Sc-Cp1O-O4 | 6 |
| IV | PY-2O-O2 | 5 |
| V | COY-3-O2 | 14 |
| V | PY-3-O2 | 14.5 |
| V | LY-Cp-O2 | 2 |
| VI | CC-4-3 | 8 |
| VI | CC-5-3 | 8 |
| VI | CP-3-O2 | 1 |
| VII | CCP-3-O1 | 5 |
| VII | CCP-V-1 | 4 |
| VII | CCP-V2-1 | 13 |
| VII | CPP-3-2V1 | 4.5 |
|  | RM-3 | 0.55 |

Δε [1 KHz, 25° C.]: −2.7
Δn [589 nm, 25° C.]: 0.104
Cp: 76° C.
$\gamma_1$: 72 mPa · s
K33: 13.5

Example 6

The formula of the liquid crystal composition and the corresponding properties thereof are as shown in table 9 below.

TABLE 9

Formulation of the liquid crystal composition of Example 6 and the corresponding properties thereof

| Category | Liquid crystal monomer code | Content (in parts by mass) |
| --- | --- | --- |
| I | CC-3-V | 19.5 |
| II | CPP-3-2 | 5 |
| III | Sc-2O-O4 | 7.5 |
| III | Sb-4O-O4 | 7 |
| III | Sc-Cp1O-O4 | 13 |
| IV | PY-2O-O2 | 7 |
| IV | PY-2O-O4 | 3 |
| VI | CC-2-3 | 20 |
| VI | CC-5-3 | 5 |
| VI | CP-3-O2 | 4.5 |
| VII | CCP-V2-1 | 5 |
| VII | CPP-3-2V1 | 3.5 |
|  | RM-4 | 0.38 |

Δε [1 KHz, 25° C.]: −3.6
Δn [589 nm, 25° C.]: 0.107
Cp: 61° C.
γ$_1$: 74 mPa · s
K33: 10.6

Comparative Example 2

The formula of the liquid crystal composition and the corresponding properties thereof are as shown in table 10 below.

TABLE 10

Formulation of the liquid crystal composition of Comparative Example 2 and the corresponding properties thereof

| Category | Liquid crystal monomer code | Content (in parts by mass) |
| --- | --- | --- |
|  | CC-5-V | 19.5 |
| II | CPP-3-2 | 5 |
| III | Sc-2O-O4 | 7.5 |
| III | Sb-4O-O4 | 7 |
| III | Sc-Cp1O-O4 | 13 |
| IV | PY-2O-O2 | 7 |
| IV | PY-2O-O4 | 3 |
| VI | CC-2-3 | 20 |
| VI | CC-5-3 | 5 |
| VI | CP-3-O2 | 4.5 |
| VII | CCP-V2-1 | 5 |
| VII | CPP-3-2V1 | 3.5 |
|  | RM-4 | 0.38 |

Δε [1 KHz, 25° C.]: −3.7
Δn [589 nm, 25° C.]: 0.107
Cp: 63° C.
γ$_1$: 85 mPa · s
K33: 10.7

CC-3-V in Example 6 is replaced by CC-5-V to form Comparative Example 2. Compared with Comparative Example 2, the example of the embodiments of the present disclosure differs to a smaller extent in the properties of dielectricity, refractive index, clearing point, and K value. It can be seen therefrom that the liquid crystal composition of the present disclosure has a smaller rotary viscosity γ1, a smaller γ1/K33, and a fast response.

Example 7

The formula of the liquid crystal composition and the corresponding properties thereof are as shown in table 11 below.

TABLE 11

Formulation of the liquid crystal composition of Example 7 and the corresponding properties thereof

| Category | Liquid crystal monomer code | Content (%) |
| --- | --- | --- |
| I | CC-3-V | 25 |
| II | CPP-3-2 | 5 |
| II | CPP-5-2 | 3 |
| III | Sb-Cp1O-O4 | 7 |
| III | Sc-Cp1O-O4 | 5 |
| IV | PY-2O-O2 | 5 |
| IV | PY-2O-O4 | 11 |
| VI | CC-2-3 | 13 |
| VI | CC-5-3 | 9 |
| VI | CC-4-3 | 8 |
| VI | CP-3-O2 | 7 |
| VI | CP-5-O2 | 2 |
|  | RM-4 | 0.05 |

Δε [1 KHz, 25° C.]: −2.4
Δn [589 nm, 25° C.]: 0.089
Cp: 55° C.
γ$_1$: 51 mPa · s
K33: 10.1

Example 8

The formulation of the liquid crystal composition and the corresponding properties thereof are as shown in table 12 below.

TABLE 12

Formulation of the liquid crystal composition of Example 8 and the corresponding properties thereof

| Category | Liquid crystal monomer code | Content (in parts by mass) |
| --- | --- | --- |
| I | CC-3-V | 17 |
| II | CPP-3-2 | 7 |
| II | CPP-5-2 | 7 |
| III | Sc-2O-O4 | 9 |
| IV | PY-2O-O4 | 6 |
| IV | PY-2O-O2 | 5 |
| V | CY-3-O2 | 15 |
| V | COY-3-O2 | 13 |
| V | CCOY-3-O2 | 4.5 |
| V | PYP-2-3 | 3 |
| VII | CPP-3-2V1 | 9 |
| VII | CCP-3-O1 | 4.5 |
|  | RM-2 | 0.45 |

Δε [1 KHz, 25° C.]: −4.2
Δn [589 nm, 25° C.]: 0.116
Cp: 75° C.
γ$_1$: 114 mPa · s
K33: 14.7

Example 9

The formulation of the liquid crystal composition and the corresponding properties thereof are as shown in table 13 below.

TABLE 13

Formulation of the liquid crystal composition of Example 9 and the corresponding properties thereof

| Category | Liquid crystal monomer code | Content (in parts by mass) |
|---|---|---|
| I | CC-3-V | 35.5 |
| II | CPP-3-1 | 5 |
| II | CPP-5-2 | 1 |
| III | Sc-2O-O4 | 5 |
| III | Sc-Cp1O-O4 | 9 |
| IV | PY-2O-O2 | 5 |
| IV | PY-2O-O4 | 13 |
| VII | CPP-1V-2 | 4.5 |
| VII | CPP-3-2V1 | 9 |
| VII | CCP-3-O1 | 8 |
| VII | CCP-V2-1 | 5 |
| | RM-3 | 0.98 |

Δε [1 KHz, 25° C.]: −2.4
Δn [589 nm, 25° C.]: 0.124
Cp: 93° C.
$\gamma_1$: 91 mPa · s
K33: 16.6

Example 10

The formulation of the liquid crystal composition and the corresponding properties thereof are as shown in table 14 below.

TABLE 14

Formulation of the liquid crystal composition of Example 10 and the corresponding properties thereof

| Category | Liquid crystal monomer code | Content (in parts by mass) |
|---|---|---|
| I | CC-3-V | 29.5 |
| II | CPP-3-2 | 3 |
| III | Sb-Cp1O-O2 | 4 |
| IV | Sc-Cp1O-O4 | 5 |
| IV | PY-2O-O2 | 5 |
| IV | PY-3-O2 | 12 |
| IV | CY-3-O2 | 3 |
| V | CCY-3-O2 | 10.5 |
| V | LY-Cp-O2 | 2 |
| V | CCOY-3-O2 | 13 |
| VI | CC-3-V1 | 3.5 |
| VII | CCP-3-O1 | 3.5 |
| VII | CPP-1V-2 | 6 |
| | RM-2 | 0.02 |

Δε [1 KHz, 25° C.]: −4.0
Δn [589 nm, 25° C.]: 0.108
Cp: 81° C.
$\gamma_1$: 105 mPa · s
K33: 15.1

Example 11

The formulation of the liquid crystal composition and the corresponding properties thereof are as shown in table 15 below.

TABLE 15

Formulation of the liquid crystal composition of Example 11 and the corresponding properties thereof

| Category | Liquid crystal monomer code | Content (in parts by mass) |
|---|---|---|
| I | CC-3-V | 28 |
| II | CPP-3-2 | 6 |
| III | Sb-Cp1O-O2 | 5 |
| IV | PY-O2-O4 | 9 |
| IV | PY-2O-O2 | 5 |
| V | CY-3-O2 | 7 |
| V | CCY-3-O2 | 6 |
| V | CCY-2-O2 | 10.5 |
| V | CPY-3-O2 | 11 |
| V | CLY-3-O2 | 8 |
| VI | CC-3-V1 | 4.5 |
| | RM-4 | 0.40 |

Δε [1 KHz, 25° C.]: −4.1
Δn [589 nm, 25° C.]: 0.112
Cp: 87° C.
$\gamma_1$: 131 mPa · s
K33: 17.0

Example 12

The formulation of the liquid crystal composition and the corresponding properties thereof are as shown in table 16 below.

TABLE 16

Formulation of the liquid crystal composition of Example 12 and the corresponding properties thereof

| Category | Liquid crystal monomer code | Content (in parts by mass) |
|---|---|---|
| I | CC-3-V | 29.5 |
| II | CPP-3-2 | 3.5 |
| III | Sc-CP1O-O4 | 5 |
| III | Sb-CP1O-O4 | 4 |
| IV | PY-2O-O2 | 5 |
| V | CCOY-3-O2 | 13 |
| V | CCY-3-O2 | 8 |
| V | CCY-2-O2 | 2.5 |
| V | PY-3-O2 | 14 |
| V | LY-Cp-O2 | 2 |
| VI | CC-3-V1 | 5.5 |
| VII | CPP-1V-2 | 8 |
| | RM-4 | 0.37 |

Δε [1 KHz, 25° C.]: −3.9
Δn [589 nm, 25° C.]: 0.111
Cp: 79° C.
$\gamma_1$: 98 mPa · s
K33: 14.3

Comparative Example 3

The formulation of the liquid crystal composition and the corresponding properties thereof are as shown in table 17 below.

TABLE 17

Formulation of the liquid crystal composition of Comparative Example 3 and the corresponding properties thereof

| Category | Liquid crystal monomer code | Content (in parts by mass) |
|---|---|---|
|  | CC-2-3 | 29.5 |
| II | CPP-3-2 | 3.5 |
| III | Sc-CP1O-O4 | 5 |
| III | Sb-CP1O-O4 | 4 |
| IV | PY-2O-O2 | 5 |
| V | CCOY-3-O2 | 13 |
| V | CCY-3-O2 | 8 |
| V | CCY-2-O2 | 2.5 |
| V | PY-3-O2 | 14 |
| V | LY-Cp-O2 | 2 |
| VI | CC-3-V1 | 5.5 |
| VII | CPP-1V-2 | 8 |
|  | RM-4 | 0.37 |

Δε [1 KHz, 25° C.]: −4.1
Δn [589 nm, 25° C.]: 0.107
Cp: 73° C.
γ₁: 109 mPa · s
K33: 12.5

CC-3-V in Example 12 is replaced by CC-2-3 to form Comparative Example 3. Compared with Comparative Example 3, the example of the present disclosure has no crystal precipitation at normal temperature whereas the composition of Comparative Example 2 has a crystal precipitated at normal temperature; moreover, the example of the present disclosure has an increased optical anisotropy, an increased clearing point, a reduced rotary viscosity, an increased K33, a reduced γ1/K33, and a fast response.

Example 13

The formulation of the liquid crystal composition and the corresponding properties thereof are as shown in table 18 below.

TABLE 18

Formulation of the liquid crystal composition of Example 13 and the corresponding properties thereof

| Category | Liquid crystal monomer code | Content (in parts by mass) |
|---|---|---|
| I | CC-3-V | 29.5 |
| II | CPP-3-2 | 8 |
| III | Sb-CP1O-O4 | 5 |
| IV | PY-2O-O2 | 5 |
| V | CCOY-3-O2 | 13 |
| V | CCY-3-O2 | 9 |
| V | PY-3-O2 | 15 |
| VI | CC-3-V1 | 9.5 |
| VII | CPP-3-2V1 | 6 |
|  | RM-4 | 0.41 |

Δε [1 KHz, 25° C.]: −3.4
Δn [589 nm, 25° C.]: 0.107
Cp: 81° C.
γ₁: 93 mPa · s
K33: 16.0

Comparative Example 4

The formulation of the liquid crystal composition and the corresponding properties thereof are as shown in table 19 below.

TABLE 19

Formulation of the liquid crystal composition of Comparative Example 4 and the corresponding properties thereof

| Category | Liquid crystal monomer code | Content (in parts by mass) |
|---|---|---|
| I | CC-3-V | 29.5 |
|  | CCP-3-1 | 8 |
| III | Sb-CP1O-O4 | 5 |
| IV | PY-2O-O2 | 5 |
| V | CCOY-3-O2 | 13 |
| V | CCY-3-O2 | 9 |
| V | PY-3-O2 | 15 |
| VI | CC-3-V1 | 9.5 |
| VII | CPP-3-2V1 | 6 |
|  | RM-4 | 0.41 |

Δε [1 KHz, 25° C.]: −3.3
Δn [589 nm, 25° C.]: 0.102
Cp: 82° C.
γ₁: 97 mPa · s
K33: 16.0

CPP-3-2 in Example 13 is replaced by CCP-3-1 to form Comparative Example 4. Compared with Comparative Example 4, the example of the present disclosure has an increased optical anisotropy, a reduced rotary viscosity γ1, a smaller γ1/K33, and a fast response. The liquid crystal composition of the present invention can be used for developing a low cell-thickness, fast-response liquid crystal display due to having a large optical anisotropy.

Obviously, the above-mentioned examples of the present disclosure are merely examples for clearly illustrating the present disclosure, rather than limiting the embodiments of the present disclosure; for a person of ordinary skill in the art, on the basis of the above description, other variations or changes in different forms may also be made, it is impossible to exhaustively give all of the embodiments thereof herein, and any obvious variation or change derived from the technical solution of the present invention is still within the scope of protection of the present invention.

The invention claimed is:

1. A liquid crystal composition, comprising a compound represented by formula I, a compound represented by formula II, a compound represented by formula Sb-Cp1O-O2, a compound represented by formula Sc-Cp1O-O4, two or more compounds represented by formula IV which at least include a compound represented by formula PY-2O-O2 and a compound represented by formula PY-3-O2, a compound represented by formula V-4, a compound represented by formula V a LY-Cp-O2, a compound represented by formula VII a CPP-1V-2, and at least one polymerizable compound:

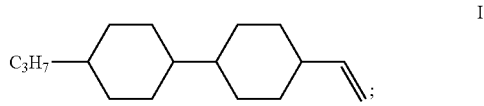

I

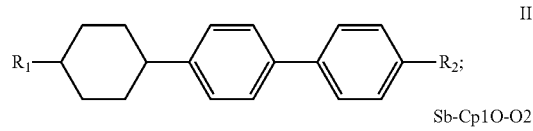

II

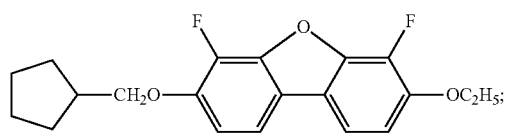

Sb-Cp1O-O2

-continued

Sb-Cp1O-O4
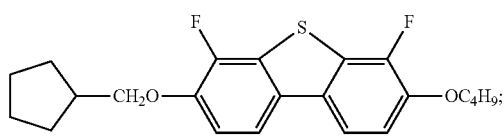

IV
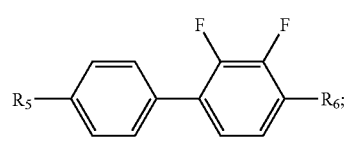

PY-2O-O2
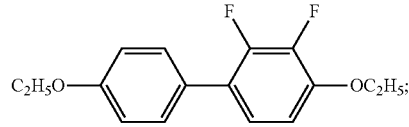

PY-3-O2
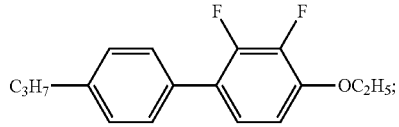

V-4
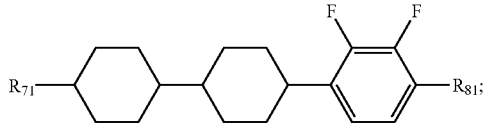

LY-Cp-O2
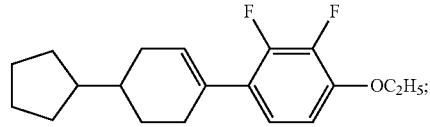

CPP-IV-2
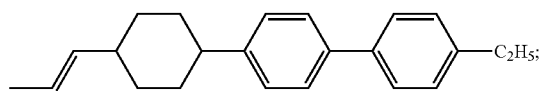

wherein in formula II, $R_1$ represents an alkyl group having a carbon atom number of 3 and $R_2$ represents an alkyl group having a carbon atom number of 2;
in formula IV, $R_5$ represents an alkyl group having a carbon atom number of 1-10 or an alkoxy group having a carbon atom number of 1-10, and $R_6$ represent an alkoxy group having a carbon atom number of 1-10;
R71 represents an alkyl group having a carbon atom number of 3;
R81 represents an alkoxy group having a carbon atom number of 2;
a total mass content of the compound represented by formula I is 29.5%; a total mass content of the compound represented by formula II is 3%; a total mass content of the compound represented by formula Sb-Cp1O-O2 is 4%; a total mass content of the compound represented by formula Sc-Cp1O-O4 is 5%; and the polymerizable compound is added in an amount of 0.03%-0.4% on the basis of the total mass % of the liquid crystal; a total mass content of the compound represented by formula PY-2O-O2 is 5%; a total mass content of the compound represented by formula PY-3-O2 is 12%; a total mass content of the compound represented by formula V-4 is 10.5%; a total mass content of the compound represented by formula LY-Cp-O2 is 2%; a total mass content of the compound represented by formula CPP-1V-2 is 6%.

2. The liquid crystal composition according to claim 1, wherein said liquid crystal composition further comprises one or more compounds represented by formula VI-1:

VI-1
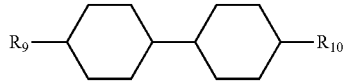

$R_9$ represents an alkyl group having a carbon atom number of 3, and $R_{10}$ represents an alkenyl group having a carbon atom number of 3.

3. The liquid crystal composition according to claim 1, wherein said liquid crystal composition further comprises one or more compounds represented by formula VII:

VII

wherein $R_{11}$ and $R_{12}$ represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10; and

 and 

each independently represent 1,4-cyclohexylene, 1,4-cyclohexenylene or 1,4-phenylene;
furthermore, where

represents 1,4-cyclohexylene, and

represents 1,4-phenylene, $R_{11}$ and $R_{12}$ do not simultaneously represent an alkyl group having a carbon atom number of 1-10.

4. The liquid crystal composition according to claim 3, wherein said one or more compounds represented by formula VII are selected from the group consisting of compounds represented by formulas VII-1 to VII-3:

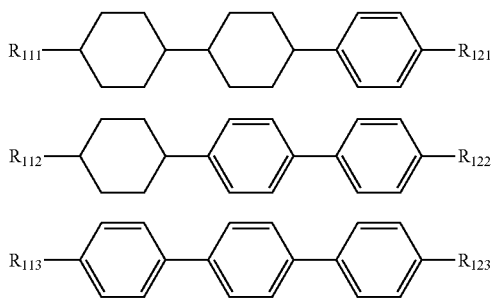

wherein $R_{111}$, $R_{112}$, $R_{113}$, $R_{121}$, $R_{122}$ and $R_{123}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10; furthermore in formula VII-2, $R_{112}$ and $R_{122}$ do not simultaneously represent an alkyl group having a carbon atom number of 1-10.

5. A liquid crystal display element, comprising the liquid crystal composition of claim 1, wherein said liquid crystal display element is an active matrix addressing display element, or a passive matrix addressing display element.

6. A liquid crystal display, comprising the liquid crystal composition of claim 1, wherein said liquid crystal display is an active matrix addressing display, or a passive matrix addressing display.

* * * * *